W. G. RANSOM.
LOAD REGULATED BRAKE MECHANISM.
APPLICATION FILED JAN. 22, 1912.
1,133,667.
Patented Mar. 30, 1915.
4 SHEETS—SHEET 4.
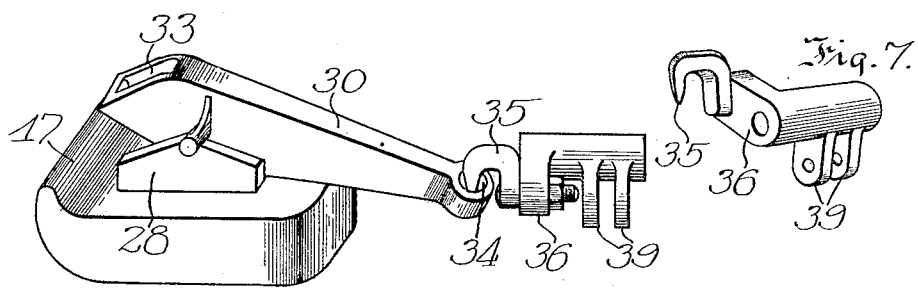
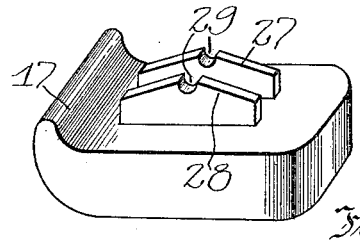
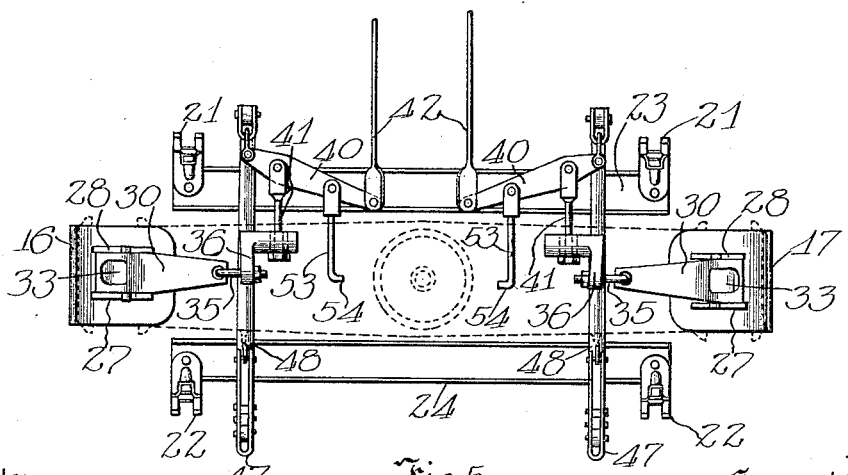

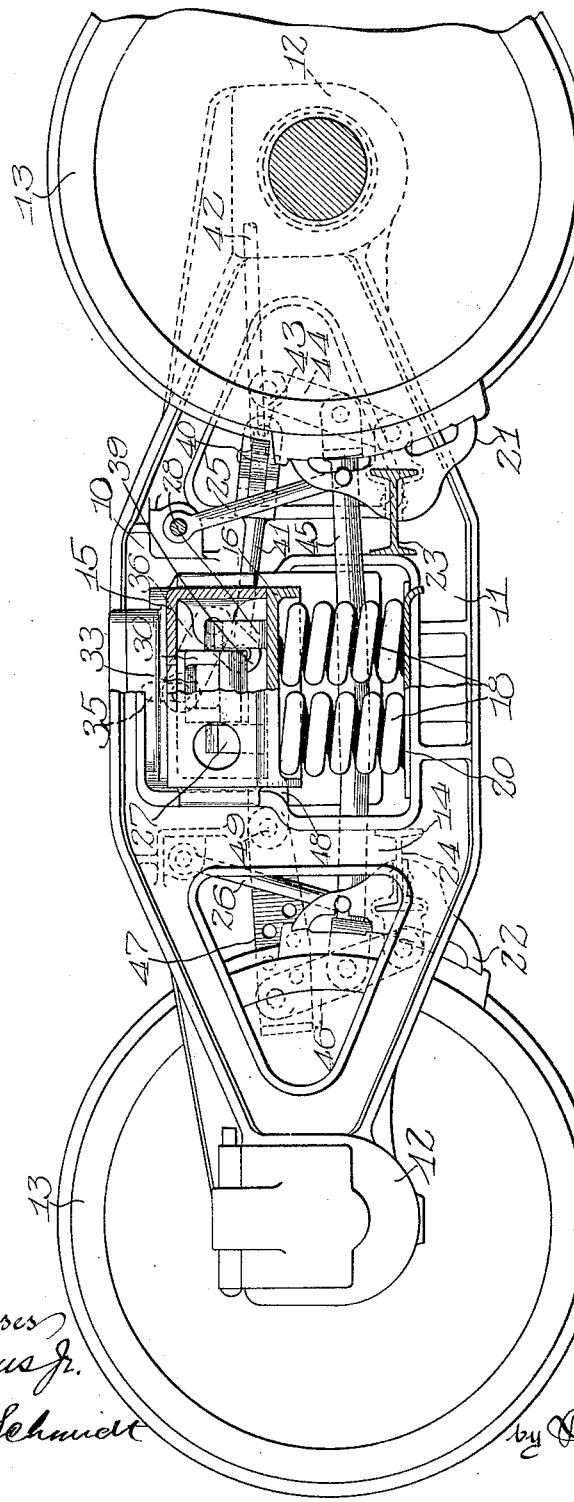

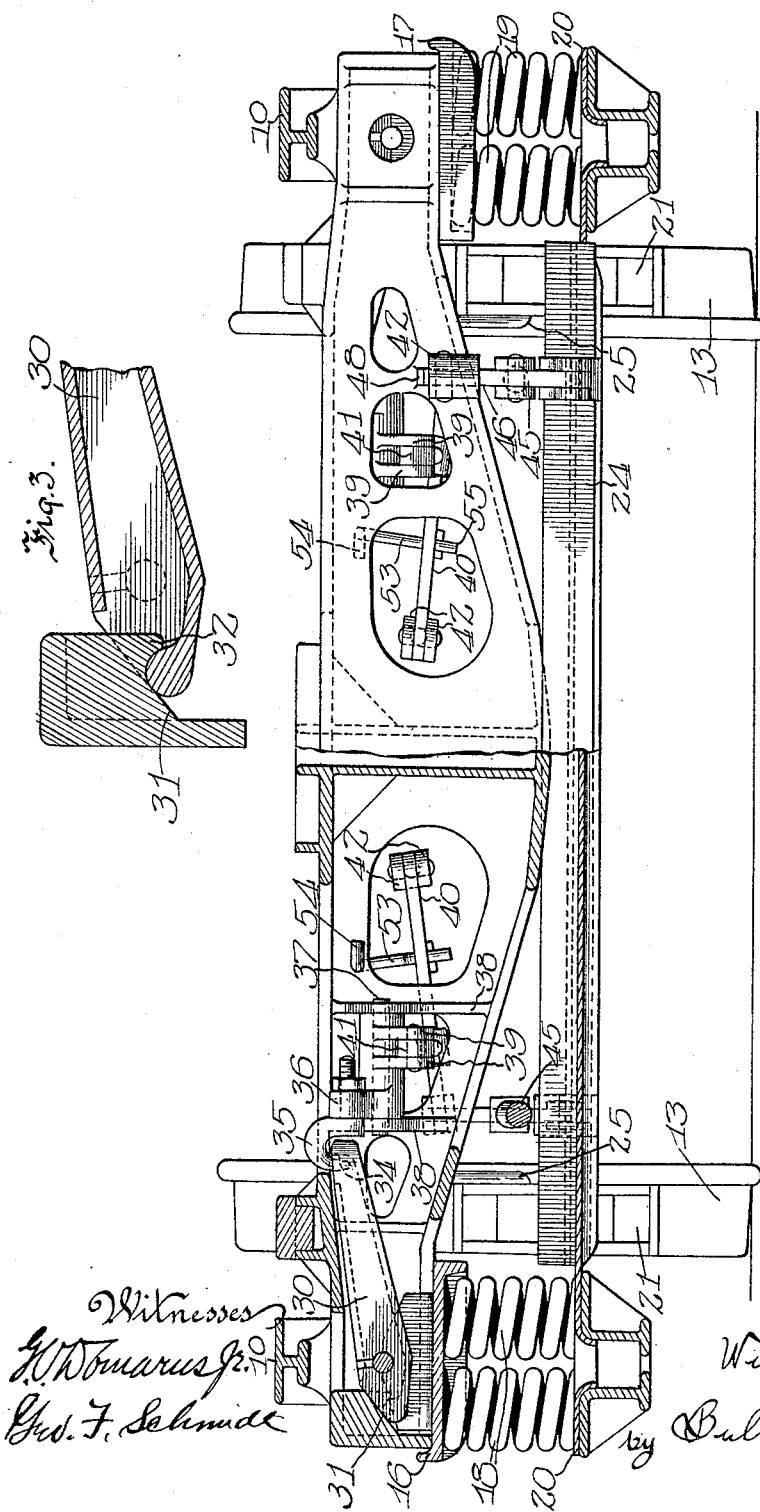

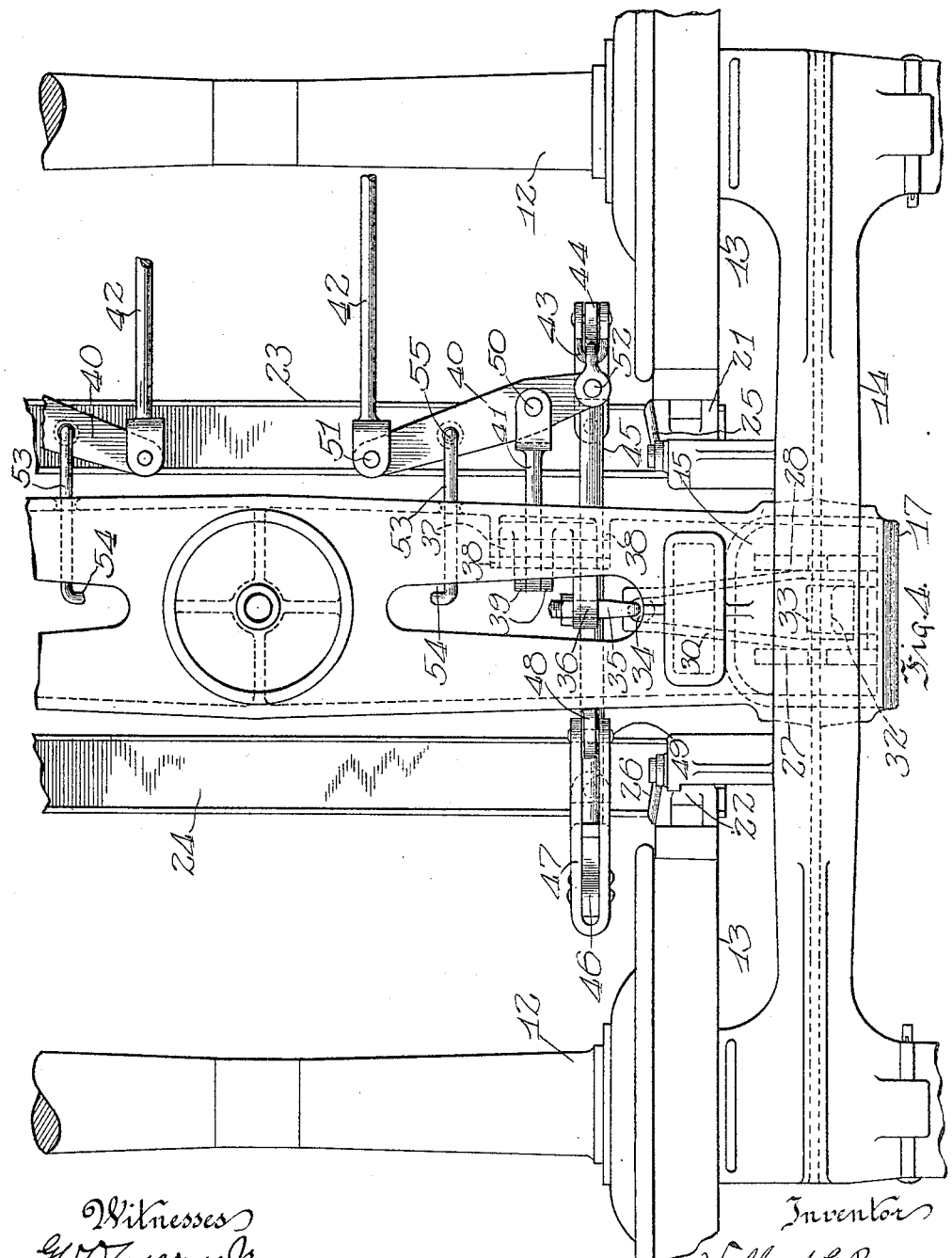

UNITED STATES PATENT OFFICE.

WILLARD G. RANSOM, OF DAVENPORT, IOWA.

LOAD-REGULATED BRAKE MECHANISM.

1,133,667. Specification of Letters Patent. Patented Mar. 30, 1915.

Application filed January 22, 1912. Serial No. 672,594.

*To all whom it may concern:*

Be it known that I, WILLARD G. RANSOM, a citizen of the United States of America, and resident of Davenport, Scott county, Iowa, have invented a certain new and useful Improvement in Load-Regulated Brake Mechanism, of which the following is a specification.

My invention relates to load regulated brake mechanism—that is, a brake mechanism in which the pressure upon the brake shoes is varied in accordance with the load carried by the car truck. It is well known that in braking a train of cars in which some are loaded while others are empty, if sufficient force is applied to effectively brake the loaded cars this same force will cause the wheels of the empty or lightly loaded cars to skid. To overcome this objectionable operation, I have devised a load regulated device in which the leverage of one or more connecting members by which the power is applied to the brake shoes is varied. When the power is applied to a loaded car the maximum leverage is obtained, and when it is applied to an empty or lightly loaded car the minimum leverage is obtained.

More specifically, my invention includes a lever which operates as a simple lever of three forces when the brake-actuating power develops insufficient force to lift the load, and which lever acts as a compound lever or a lever acting under four or more forces when the brake-actuating force is capable of lifting the load.

My present invention is an improvement upon the variable load brake mechanism described in my Patent Number 1,016,289, issued February 6, 1912. The general principles of my present invention are somewhat similar to those disclosed in my prior patent referred to. My present invention, however, is in the nature of an improvement upon my former structure, in that the arrangement of levers for operating my brake mechanism is much simplified; and furthermore, it is possible by my new arrangement to employ a standard type of truck side frame, while in my former structure it was necessary to employ a special type of frame.

These and other objects and features of my invention will be more clearly understood by having reference to the accompanying drawings, in which—

Figure 1 is an end elevation, one-half being shown in section, of a car truck embodying the features of my invention. Fig. 2 is a side elevation of the same, one-half being shown in section. Fig. 3 is a detail sectional view showing the manner in which the weight-lifting lever engages with the bolster. Fig. 4 is a plan view of a part of a truck. Fig. 5 is a diagrammatic plan showing the operating parts, the bolster being shown in dotted lines. Fig. 6 is a detail view of the spring tray. Fig. 7 is a detail view of the bell crank. Fig. 8 is a detail view showing the relative relation of the spring tray, weight-lifting lever and bell crank.

Throughout the drawings similar reference characters refer to similar parts.

I have illustrated a car truck comprising a side frame of the usual construction. The side frame comprises an upper arch bar 10, and a lower arch bar 11, in the ends of which are supported suitable bearings 12 for the car wheels 13. Columns 14 unite the upper and lower arch bars in the well known manner, these columns being spaced apart and providing an opening for the reception of the end of the bolster 15. This bolster is of a well known type, and is supported by the spring caps 16—17, which spring caps are located on top of the bolster springs 18—19. The lower ends of these springs are supported by the spring-plate 20 in the usual and well known manner. The brake heads 21—22 are carried by the brake beams 23—24, respectively. These brake heads are hung from the brake hangers 25—26, which hangers are pivotally mounted in the upper portion of the side frame.

The spring caps are provided with a pair of upstanding lugs 27—28, which lugs are provided with recesses 29 which form pivotal bearings for the weight-lifting lever 30. These lugs and weight-lifting lever are located inside of the bolster, which is hollow, and the end of this weight-lifting lever is beveled and engages with the end portion 31 of the bolster, in the manner clearly shown in Figs. 2 and 3. This end portion of the bolster is provided with a downwardly extending lug or projection 32, which engages with an opening 33 in the beveled end of the weight-lifting lever. The opposite end of this weight-lifting lever is provided with a socket 34 with which the hooked end portion 35 of the bell crank 36 engages. This bell crank is pivotally supported on the inside of the bolster upon the pin 37, which pin is supported by inwardly extending lugs 38. A pair of downwardly extending ears 39 constitute the second arm of this bell crank, and these ears are connected with the floating lever 40 by means of the rod 41. The inner end of this floating lever 40 is connected by the connecting rod 42 to the air cylinder. This air cylinder and the connections thereto are not a part of my present invention, and can be of any of the well known types. I have therefore not thought it necessary to illustrate the same. At a point on the floating lever, intermediate the end at which the connecting rod 42 is connected and the point of connection of the rod 41, a rod 53 is connected. This rod passes through an opening in the side of the bolster and is provided with a curved end portion which is adapted to engage said bolster in a manner which will be more particularly hereinafter pointed out. The opposite end of this floating lever 40 is connected by links 43 to the live brake lever 44, the lower end of which brake lever is connected to the brake beam 23. At an intermediate point upon the live brake lever a rod 45 is connected, which rod extends to the dead brake lever 46 upon the opposite side of the side frame. The lower end of the dead brake lever is connected to the brake beam 24, while the upper end is connected with the yoke-shaped arm 47, which yoke arm is mounted upon the lugs 48 by means of the pin 49. These lugs 48 are preferably made integral with the bolster 15. The ends of the arm 47 are provided with a series of holes for the reception of a pin by means of which the position of the lever 46, which is attached to the brake beam 24, can be varied so as to take up for any wear of the brake shoes and other parts.

The operation of the braking mechanism is as follows: When the power is applied to the connecting rod 42 by means of air pressure or other means, this arm is pulled toward the right (looking at Fig. 4). This movement of the arm tends to swing the floating lever 40 about its pivot. The pivot about which this lever 40 rotates depends upon the load upon the truck. First assume that the car is loaded, in this case the weight-lifting lever 30 is unable to lift the end of the bolster through its contact with the inside face of the outer end thereof, and therefore the rod 41 remains stationary, owing to its connection with the weight-lifting lever 30 through the medium of the bell crank lever 36. The floating lever 40 therefore fulcrums about the point 50, and thus acts as a simple lever with one point of connection at the point 51 where the connecting rod 42 acts therewith, and the other point of connection at the point 52 where the brake shoes connect with this lever. The power applied to the brakes is therefore proportionate to the ratio between the distance between the points 50 and 51 to the distance between the points 50 and 52. This movement is transmitted to the brake shoes through the live brake lever 44 which first operates through the rod 45 to press the brake shoe carried by the brake head 21 against the wheel 13, at which time the brake lever 44 pivots about the point of connection between this lever and the rod 45 to thereby press the brake shoe carried by the brake head 21 against the associated wheel. Next, assume that when the power is applied to the connecting rod 42 the weight-lifting lever is able to lift the bolster off the spring cap owing to the lightness of the load. In this case after the movement of the lever 42 has caused the brake shoes to bear against the wheels with a pressure equal to the pressure required to lift the weight of the car, then further movement of the rod 42 causes a corresponding movement of the floating lever 40. This movement of the lever 40 would act to exert a pull upon the rod 41 which is connected to the bell crank 36, which bell crank operates to transmit power to the weight-lifting lever 30 to lift the bolster from the springs. This movement of the rod 41 permits the floating lever 40 to move to the right until the inturned end 54 upon the rod 53 engages with the side of the bolster. This engagement of the end 54 prevents further movement of this rod 53, and therefore when power is still further applied to the connecting rod 42 the floating lever 40 pivots about the point 55. Under these conditions it will be seen that the power applied to the brake shoes has been greatly decreased, as this power is now proportionate to the ratio between the distances from the point 55 to 51 to the distances between the points 55 and 52, plus the force exerted on the lifting lever by the weight of the empty car body. This extra force is due to the weight of the car body operating on the floating lever 40 in the same direction as the force applied to the rod 42, through the medium of the weight-lifting lever and bell crank.

It will thus be seen that I have devised a very efficient form of load regulated brake mechanism, and one in which comparatively few levers and connecting links are required, and in which a standard type of side frame can be employed. While I have illustrated one particular embodiment of my invention, it is to be understood that I do not wish to limit myself to the exact construction shown and described, as various modifications and changes may be made without departing from the spirit of my invention.

What I claim as my invention is:

1. In a load regulated brake mechanism, a power rod, a brake lever and lifting devices, a longitudinal floating lever connected intermediately of its ends to the lifting devices, at one end to the power rod and at its opposite end to the brake lever, and means whereby said floating lever fulcrums about one point under certain load conditions and about a second point under other load conditions.

2. A load regulated mechanism for cars, comprising a car truck having side frames, brake shoes carried by said truck, means for moving said shoes toward and from the car wheels, said means including a floating lever, a connection from one end of said lever to the brake-actuating power, a connection from the other end thereof to the brake shoes, a weight-lifting lever, pivotal connections from an intermediate point on said floating lever to said weight-lifting lever, and means whereby said floating lever pivots about the point of connection to said weight-lifting lever under certain load conditions, and about a second point under other load conditions.

3. A load regulated brake for cars, comprising a car truck having side frames, brake shoes carried by said truck, means for moving said shoes toward and from the car wheels, said means including a floating lever, a connection from one end of said lever to the brake-actuating power, a connection from the other end thereof to the brake shoes, a weight-lifting lever, a bell crank having one arm connected to said weight-lifting lever and the other end connected to an intermediate point on said floating lever, and means whereby said floating lever pivots about the point of connection to said weight-lifting lever under certain load conditions, and about a second point under other load conditions.

4. A load regulated brake for cars, comprising a car truck having side frames, a bolster, bolster springs supporting the ends of said bolster in said side frames, a weight-lifting lever operating to lift said bolster from said springs, brake shoes, means for moving said shoes to and from the car wheels, and means whereby the power applied to said shoes is controlled by said weight-lifting lever.

5. A load regulated brake for cars, comprising a car truck having side frames, a bolster, bolster springs, a spring cap resting on top of said springs and supporting the ends of said bolster in said side frames, a weight-lifting lever operating to lift said bolster from said spring cap, brake shoes, means for moving said shoes to and from the car wheels, and means whereby the power applied to said shoes is controlled by said weight-lifting lever.

6. A load regulated brake for cars, comprising a car truck having side frames, a bolster, bolster springs supporting the ends of said bolster in said side frames, a weight-lifting lever operating to lift said bolster from said springs, brake shoes, and means for moving said shoes to and from the car wheels, said means including a lever and connections from said lever to the brake-actuating power, to said brake shoes, and to said weight-lifting lever.

7. A load regulated brake for cars, comprising a car truck having side frames, a bolster, bolster springs, a spring cap resting on top of said springs and supporting the ends of said bolster in said side frames, a weight-lifting lever operating to lift said bolster from said spring cap, brake shoes, and means for moving said shoes to and from the car wheels, said means including a lever and connections from said lever to the brake-actuating power, to said brake shoes and to said weight-lifting lever.

8. A load regulated brake for cars, comprising a car truck having side frames, a bolster, bolster springs supporting the ends of said bolster in said side frames, a weight-lifting lever operating to lift said bolster from said springs, brake shoes, means for moving said shoes to and from the car wheels, said means including a floating lever, connections from one end of said lever to the brake-actuating power, connections from an intermediate point to said weight-lifting lever.

9. A load regulated brake for cars, comprising a car truck having side frames, a bolster, bolster springs, a spring cap resting on top of said springs and supporting the ends of said bolster in said side frames, a weight-lifting lever operating to lift said bolster from said spring cap, brake shoes, means for moving said shoes to and from the car wheels, said means including a floating lever, connections from one end of said lever to the brake-actuating power, connections at the opposite end to said brake shoes, and connections from an intermediate point to said weight-lifting lever.

10. A load regulated brake for cars, comprising a car truck having side frames, a bolster, bolster springs supporting the ends of said bolster in said side frames, a weight-lifting lever operating to lift said bolster from said springs, brake shoes, means for moving said shoes to and from the car wheels, said means including a floating lever, connections therefrom to the brake-actuating power, to said brake shoes and to said weight-lifting lever, and means whereby said floating lever fulcrums on the point of connection to the weight-lifting lever under heavy load conditions, and fulcrums about another point under light load conditions.

11. A load regulated brake for cars, comprising a car truck having side frames, a bolster, bolster springs, a spring cap resting on top of said springs and supporting the ends of said bolster in said side frames, a weight-lifting lever operating to lift said bolster from said spring cap, brake shoes, means for moving said shoes to and from the car wheels, said means including a floating lever, connections therefrom to the brake-actuating power, to said brake shoes and to said weight-lifting lever, and means whereby said floating lever fulcrums on the point of connection to the weight - lifting lever under heavy load conditions, and fulcrums about another point under light load conditions.

12. A load regulated brake for cars, comprising a car truck having side frames, a bolster, bolster springs supporting the ends of said bolster in said side frames, a weight-lifting lever operating to lift said bolster from said springs, brake shoes, means for moving said shoes to and from the car wheels, said means including a floating lever, connections from one end of said lever to the brake-actuating power, connections at the opposite end to said brake shoes, and connections from an intermediate point to said weight-lifting lever, and means whereby said floating lever fulcrums on the point of connection to the weight-lifting lever under heavy load conditions, and fulcrums about another point under light load conditions.

13. A load regulated brake for cars, comprising a car truck having side frames, a bolster, bolster springs, a spring cap resting on top of said springs and supporting the ends of said bolster in said side frames, a weight-lifting lever operating to lift said bolster from said spring cap, brake shoes, means for moving said shoes to and from the car wheels, said means including a floating lever, connections from one end of said lever to the brake-actuating power, connections at the opposite end to said brake shoes, and connections from an intermediate point to said weight-lifting lever, and means whereby said floating lever fulcrums on the point of connection to the weight - lifting lever under heavy load conditions, and fulcrums about another point under light load conditions.

14. A load regulated brake for cars, comprising a car truck having side frames, a bolster, bolster springs, a spring cap resting on top of said springs and supporting the ends of said bolster in said side frames, a weight-lifting lever operating to lift said bolster from said spring cap, brake shoes, means for moving said shoes to and from the car wheels, said means including a floating lever and connections therefrom to the brake-actuating power and to said brake shoes, and a bell crank having one arm connected to one end of said weight-lifting lever and the other arm connected with said floating lever.

15. A variable load brake for cars, comprising a car truck having side frames, a bolster, bolster springs, a spring cap resting on top of said springs and supporting the ends of said bolster in said side frames, a weight-lifting lever operating to lift said bolster from said spring cap, brake shoes, means for moving said shoes to and from the car wheels, said means including a floating lever, connections from one end of said lever to the brake-actuating power, connections at the opposite end to said brake shoes, a bell crank having one arm connected to one end of said weight-lifting lever and the other arm connected to an intermediate point on said floating lever.

16. A load regulated brake for cars, comprising a car truck having side frames, a bolster, bolster springs, a spring cap resting on top of said springs and supporting the ends of said bolster in said side frames, a weight-lifting lever operating to lift said bolster from said spring cap, brake shoes, means for moving said shoes to and from the car wheels, said means including a floating lever, connections from one end of said lever to the brake-actuating power, connections at the opposite end to said brake shoes, a bell crank having one arm connected to one end of said weight-lifting lever and the other arm connected to an intermediate point on said floating lever, and means whereby said floating lever fulcrums on the point of connection to the bell crank under heavy load conditions, and about a different point under light load conditions.

17. A load regulated brake for cars, comprising a car truck, having side frames, brake shoes carried by said truck, means for moving said shoes toward and from the car wheels, said means including a floating lever, a weight-lifting lever, connections between said levers, a rod connected to a second point on said floating lever and permitting said lever to move a limited distance, and means whereby said floating lever fulcrums about the point of connection to said weight-lifting lever under certain load conditions, and about the point of connection to said rod under other load conditions.

18. A load regulated brake for cars, comprising a car truck having side frames, brake shoes carried by said truck, means for moving said shoes toward and from the car wheels, said means including a floating lever, a weight-lifting lever, a bell crank having one arm connected to one end of said weight-lifting lever and the other arm connected to said floating lever, a rod connected to a second point on said floating-lever and permitting said lever to move a limited distance, and means whereby said floating lever fulcrums about the point of connection to said bell crank under certain load conditions and about the point of connection to said rod under other load conditions.

19. A load regulated brake for cars, comprising a car truck having side frames, brake shoes carried by said truck, means for moving said shoes toward and from the car wheels, said means including a floating lever, a weight-lifting lever, connections from one end of said floating lever to the brake-actuating power, a connection from the opposite end thereof to the brake shoes, a connection from an intermediate point to said weight-lifting lever, and a rod connected to a second intermediate point and permitting a limited movement of said floating lever, and means whereby said floating lever fulcrums about the point of connection to said weight-lifting lever under certain load conditions, and about the point of connection to said rod under other load conditions.

20. A load regulated brake for cars, comprising a car truck having side frames, brake shoes carried by said truck, means for moving said shoes toward and from the car wheels, said means including a floating lever, a weight-lifting lever, a bell crank having one arm connected to one end of said weight-lifting lever and the other arm connected to said floating lever connections from one end of said floating lever to the brake-actuating power, a connection from the opposite end thereof to the brake shoes, a connection from an intermediate point to said weight-lifting lever, and a rod connected to a second intermediate point and permitting a limited movement of said floating lever, and means whereby said floating lever fulcrums about the point of connection to said bell crank under certain load conditions, and about the point of connection to said rod under other load conditions.

Signed by me at Davenport, Iowa, this 18th day of January, 1912.

WILLARD G. RANSOM.

Witnesses:
C. G. STOLPE,
A. B. FRENIER.

Copies of this patent may be obtained for five cents each, by addressing the "Commissioner of Patents, Washington, D. C."